United States Patent [19]
Abbott

[11] Patent Number: 5,786,790
[45] Date of Patent: Jul. 28, 1998

[54] ON-THE-FLY ACCURACY ENHANCEMENT FOR CIVIL GPS RECEIVERS

[75] Inventor: Anthony Steven Abbott, Rancho Palos Verdes, Calif.

[73] Assignee: Northrop Grumman Corporation, Los Angeles, Calif.

[21] Appl. No.: 806,865

[22] Filed: Feb. 27, 1997

[51] Int. Cl.$^6$ ............................................. G01S 5/02
[52] U.S. Cl. ............................ 342/357; 701/214
[58] Field of Search ........................ 342/357; 701/214, 701/215

[56] References Cited

PUBLICATIONS

Blackwell, "Overview of Differential GPS Methods", Global Positioning System, vol. III, The Institute of Navigation 1986.

*Primary Examiner*—Gregory C. Issing
*Attorney, Agent, or Firm*—Terry J. Anderson; Karl J. Hoch, Jr.

[57] ABSTRACT

A method and means for enhancing the position accuracy of a civil or degraded accuracy GPS receiver by compensating for errors in its position solution with data derived from a military, or precise accuracy, GPS receiver, wherein the civil GPS receiver may be disposed in a mobile expendable vehicle and the military receiver in a mobile launch vehicle. The compensating data is obtained by a comparison of the pseudorange measurements of the military GPS set and another civil GPS set disposed with it in the launch vehicle and attached to the same antenna. Two embodiments are disclosed involving variations of calibration. 1) an On-the-Fly Relative Navigation technique, applicable when the expendable receiver tracks the same satellites as the military and civil sets are tracking, wherein the position bias determined from the measurements of the two launch sets is transferred to the expendable receiver and used to offset its solution, and 2) an On-the-Fly Differential Navigation system, used when the expendable receiver is not tracking the same satellites as the launch sets, wherein the correction process is performed relative to the military set's GPS position solution.

19 Claims, 2 Drawing Sheets

ON-THE-FLY DIFFERENTIAL GPS

ON-THE-FLY DIFFERENTIAL GPS

ON-THE-FLY ACCURACY ENHANCEMENT FOR CIVIL GPS RECEIVERS

BACKGROUND OF THE INVENTION

1. Field of the Invention

The present invention relates to the use of Global Positioning Systems (GPS), such as the NAVSTAR GPS, and, more particularly, to a method and means for enhancing the accuracy of a civil or degraded accuracy GPS receiver by compensating for its inaccurate position solution with data derived from an accessible military or precise accuracy GPS receiver.

2. Prior Art

Various GPS satellite constellations are in the process of being implemented or in the planning stage to provide accurate navigational information and fixes for appropriate receivers or stations anywhere on the surface of the Earth. Among these GPS systems are the U.S. government-operated Navigation Satellite Timing and Ranging Global Positioning System, "NAVSTAR GPS", the "GLONASS" system planned by the government of the former Soviet Union, and two European systems known as "NAVSAT" and "GRANAS" presently under development. For ease of description, the following discussion and disclosure will focus specifically on the features of and use with the NAVSTAR GPS, although it will be understood that the invention has equal applicability to other global positioning systems.

The U.S. government-operated NAVSTAR GPS is designed to have four orbiting GPS satellites existing in each of six separate circular orbits to constitute a total of twenty-four GPS satellites, with twenty-one being operational and three serving as spares. The satellite orbits are neither polar nor equatorial but lie in mutually inclined planes and each satellite orbits the Earth approximately once every 12 hours, completing exactly two orbits while the Earth turns one revolution. With this arrangement at least four satellites come within the same field of view twenty-four hours a day all around the world. The position of each satellite at any given time is precisely known and navigation signals are continuously transmitted to the Earth providing position information indicating the position of the satellite in space with respect to time (GPS time). This position information is known as ephemeris data. In addition to the ephemeris data, the navigation signals transmitted by each satellite include an indication of the precise time at which the signal was transmitted. Consequently, the distance or range between a navigation signal receiver and a transmitting satellite may be determined using this time indication by 1) noting the time at which the signal was received at the receiver, 2) calculating the propagation time delay, i.e., the difference between the time transmitted and time received, and 3) multiplying the delay by the speed of propagation of the signal. The result of this determination will yield a "pseudorange" from the transmitting satellite to the receiver. The range is called a "pseudorange" because inaccuracies may occur due to such factors as the receiver clock not being precisely synchronized to GPS time, and delays introduced into the navigation signal propagation times by its propagation through the atmosphere. These inaccuracies result, respectively, in a clock bias (error) and an atmospheric bias (error), with clock biases possibly as large as several milliseconds. In any event, using the two pieces of information in a navigation signal, i.e., the ephemeris data and the pseudorange, from at least four satellites, the position and time of a receiver with respect to the center of the Earth can be determined using passive triangulation techniques.

A more detailed discussion on the NAVSTAR GPS is found in an article by B. W. Parkinson and S. W. Gilbert, entitled, "NAVSTAR: Global Positioning System—Ten Years Later," Proceedings of the IEEE, Vol. 71, No. 10, October 1983, and in a text "GPS: A Guide to the Next Utility", published by Trimble Navigation Ltd., Sunnyvale, Calif., 1989, pp. 1–47, both of which are incorporated herein by reference.

The NAVSTAR GPS envisions two types of code modulation for the carrier wave propagating pseudorandom signals. In the first type, "Coarse/Acquisition" code, the carrier is modulated by a "C/A signal", and referred to as the C/A code and also as the "Standard Positioning Service" (SPS). The second type of modulation is commonly referred to as the "precise" or "protected" (P) code, and also as the "Precise Positioning Service" (PPS). An encrypted version of the P-code, i.e., Y code, is intended for use only by Earth receivers specifically authorized by the U.S. government so that Y-code sequences are kept secret and not made publicly available. This forces most NAVSTAR GPS users to rely solely on the data provided via C/A code modulation, which unfortunately results in a less accurate positioning system. Moreover, the U.S. government selectively corrupts the GPS data by introducing errors into the C/A code GPS signals being transmitted from the GPS satellites by changing the clock parameters, that is, the clock parameters for one or more satellites may be slightly or substantially modified, such as by the intentional dithering of the phase and frequency of the satellite clock, which practice is known as "selective availability" or simply SA. SA may be activated for a variety of reasons, e.g., the Department of Defense may activate it for national security. When SA is activated, the U.S. government is still able to use the NAVSTAR GPS because it has access to the means of compensation to remove SA effects. The uncompensated C/A code data, however, may be rendered substantially less accurate, i.e., degraded. In view of the foregoing distinction, C/A code modulation receivers are referred to as "civil" receivers or sets, and Y-code modulation receivers are referred to as military receivers or sets. For purposes of generality, reference to a "civil" receiver herein will indicate a varying or degraded accuracy GPS receiver or set, and reference to a "military" receiver will indicate a precise accuracy GPS receiver or set.

In many applications of GPS, it is desirable to use a civil GPS receiver, such as in a mobile or expendable vehicle, to reduce cost and complexity, even though the user has access to the crypto keys that afford Precise Positioning Service (PPS) accuracy. This is especially true in expendable vehicles or weapons that are produced in large numbers, e.g., weapons for launching from some form of launch vehicle. If the user is authorized for PPS, he may have a military GPS receiver on the launch vehicle that is much more accurate than the civil set in the expendable one.

A Differential GPS (DGPS) correction process is available for high-accuracy civil GPS applications, that uses fixed surveyed antenna coordinates and requires the corrections to come from a ground station almost in real time. Typical civil GPS receivers have inherent accuracy limitations, largely due to the aforementioned intentional degradation introduced into the signals by the U.S. Department of Defense, which limitations can be removed by the DGPS process. Civil GPS receiver accuracy, which as noted above is commonly referred to as Standard Positioning Service or SPS, without differential correction is specified to be better than 100 meters. While some of the accuracy limitation is due to the use of only one frequency, which prevents the measurement of errors due to the Ionosphere delays, and the use of the Coarse/Acquisition (C/A) code instead of the more accurate Precision P(Y) code, the primary contributor to the accuracy limitation is the intentional dithering of the phase and frequency of the satellite clock, i.e., SA. A military set removes the SA errors with an algorithm that uses data which is only available to authorized users through the use of crypto keys. In addition, the user of a militarized receiver can track a second frequency which allows the measurement of and compensation for the Ionosphere delays.

Problem to be Solved:

Thus, an accuracy problem develops in typical civil GPS receivers operating with SPS as a result of errors introduced into the system, such as by the U.S. government's practice of corrupting C/A code signals by intentional dithering of the phase and frequency of GPS satellite clocks, i.e., the use of SA.

Objects:

An object of the present invention is to enhance the accuracy of civil GPS receivers.

Another object of the invention is to provide a technique for enhancing the accuracy of a civil GPS set by correcting and processing its psuedorange measurements with differential corrections computed from a military GPS receiver and a civil GPS receiver combination.

Another object of the invention is to provide a technique for enhancing the accuracy of a mobile civil GPS set by correcting its output using accurate position predictions or estimates from a military or (PPS) GPS receiver which also may be mobile.

A further object of the invention is to enhance the accuracy of civil GPS receivers operating with SPS to compensate for the effect of SA.

SUMMARY OF THE INVENTION

The present invention involves a method and means for enhancing the accuracy of a civil GPS receiver by compensating for errors in its output with data derived from a precise accuracy or military GPS receiver. By way of example, in one embodiment the civil GPS receiver may be disposed in a mobile or expendable vehicle and the military receiver in a mobile reference or launch vehicle along with another civil GPS set. Then, in accordance with the invention, the civil GPS receiver, disposed in the mobile expendable vehicle, has it's accuracy enhanced by applying corrections to its output determined by a comparison of the outputs of the two reference sets, one civil and one military, sharing a common antenna in the reference launch vehicle, which outputs constitute the pseudorange measurements of the civil set and the position solution of the military set. Using this arrangement, two operational embodiments involving variations of the calibration are contemplated, i.e., 1) On-the-Fly Relative Navigation and 2) On-the-Fly Differential Navigation. The former technique is similar to Relative GPS calibration wherein reference military and civil sets track the satellites from the same antenna, but here the position bias, when determined, is transferred to the expendable set, which is tracking the same satellites as the reference civil set, and used to offset the expendable set's solution. The latter calibration process is used when the expendable set is not tracking the same satellites as the reference sets and is similar to the Differential GPS (DGPS) correction process used for high-accuracy civil GPS applications, except that it is performed relative to the military set's GPS solution in place of the fixed surveyed antenna coordinates normally used in DGPS.

DETAILED DESCRIPTION OF THE PREFERRED EMBODIMENTS

The present invention is directed to providing a system and techniques for enhancing the accuracy of a civil GPS receiver by compensating for errors in its measurements with data derived from a precise accuracy or military GPS receiver. In an exemplary structural embodiment, the civil GPS set may be disposed in a mobile vehicle, such as an expendable vehicle, and the military receiver may be disposed in a mobile reference vehicle, such as a launch vehicle for the expendable vehicle. This structural system may be operated using alternative calibration techniques, i.e., 1) On-the-Fly Relative Navigation or 2) On-the-Fly Differential Navigation, in accordance with the invention. When using the former Relative navigation technique the civil GPS set, disposed in the expendable vehicle, has it's position determining accuracy enhanced by applying corrections to its measurements derived from a comparison of the position solutions of two sets disposed in the launch vehicle, one civil and one military. When using the latter Differential navigation technique, the corrections are computed from the pseudorange measurements of the civil receiver in the launch vehicle and position solution information of the military receiver. It should be understood that even though the military set also uses pseudoranges measurements internally, they are classified as SECRET and are not generally available outside the receiver, so that only the position estimate from the military set is used, although it may be derived from the military set's pseudorange measurements.

Which of the two calibration embodiments is suitable for use depends on whether or not the expendable civil GPS set is tracking the same satellites as the launch vehicle's civil and military sets. These two embodiments, involving variations of calibration, operate as follows.

1) On-the-Fly Relative Navigation

Figure 1:
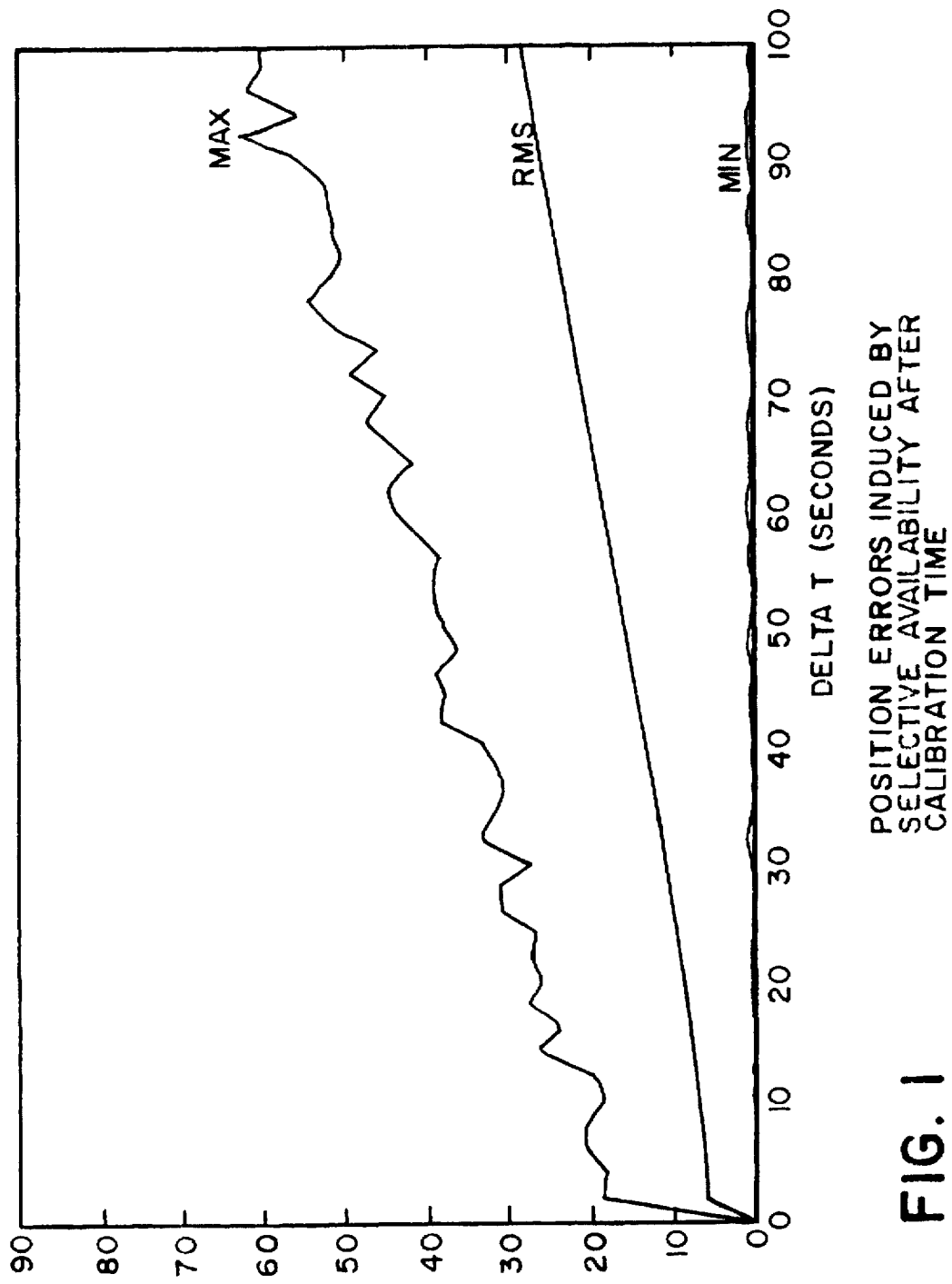
FIG. 1 is a plot showing the effect of Selective Availability (SA) applied to GPS signals and illustrating the time correlation of SA position errors.

In the event that the expendable vehicle's civil GPS receiver can track the same four satellites as the civil GPS set in the launch vehicle, a simple position offset is made to the expendable civil receiver's measured position solution to account for the SA errors. This is similar to what is commonly called Relative GPS navigation and is accomplished by having a military GPS set and a civil GPS set tracking satellites on the same antenna in the launch vehicle. Once the position bias is determined, by comparing the position measurements of the military and civil set combination, it can be transferred from the launch vehicle to the expendable civil GPS set and used to offset its position solution. The resulting solution in the expendable set will then be close to the accuracy of the military set as long as the offset is refreshed. If it is not refreshed, the accuracy of the solution will gradually degrade due to the temporal instability of the SA errors This will be seen from a consideration of FIG. 1 which is a plot showing the effect of SA applied to GPS signals and illustrating the time correlation of SA position errors.

This On-the-Fly Relative Navigation technique is simply implemented by computing the difference between the civil and military GPS set position solutions in the launch vehicle to determine a position bias. The position bias or offset computation can be processed at any suitable location, such as the launch vehicle or other mobile vehicle, any reference vehicle, or a ground station. This position offset may then be sent to the expendable vehicle just before its launch. The position solution in the expendable vehicle's civil GPS set is then adjusted, after launch, by the downloaded position offset to approach the correct solution. If the error buildup due to SA during the fall time is tolerable, then no additional correction is required. If additional accuracy is required, the updated offset can be sent to the expendable vehicle over a radio link. It should be kept in mind that the expendable civil GPS receiver must track the same four satellites as the companion civil GPS set and the military set to achieve the necessary coordination between their position solutions.

2) On-the-Fly Differential Navigation.

If the expendable vehicle's civil GPS receiver cannot be guaranteed to track the same satellites as the two GPS sets, one military and one civil, in the launch vehicle, then a form of differential correction to the pseudorange measurements of the two sets can be calculated and sent from the launch vehicle to the civil receiver in the expendable vehicle. The expendable vehicle's receiver will then use the differential corrections to improve its accuracy to the military level. It will be understood that it is not necessary for the military GPS set to track the same four satellites as the companion civil GPS set, since their use of the same antenna to pick up the GPS signals establishes a common reference point for their measurements and as the military set can use any combination of satellites to obtain an accurate position solution it need not track the same satellites. Again, if the differential corrections are updated regularly, the accuracy of the civil expendable set will be close to that of the military set. If they are not refreshed, the accuracy will gradually degrade as the SA errors change in time. For short-term expendable missions, like a munitions application, this is a fraction of the total error due to SA because SA errors are time correlated. Again as will be seen from a consideration of the plot of FIG. 1.

The On-the-Fly Differential Navigation technique is similar to that used for the conventional Differential GPS (DPGS) correction process, but instead of using a stationary antenna and receiver for the reference station and the surveyed antenna coordinates normally used in DPGS, this technique uses the position solution of the military set as the reference point.

Figure 2:
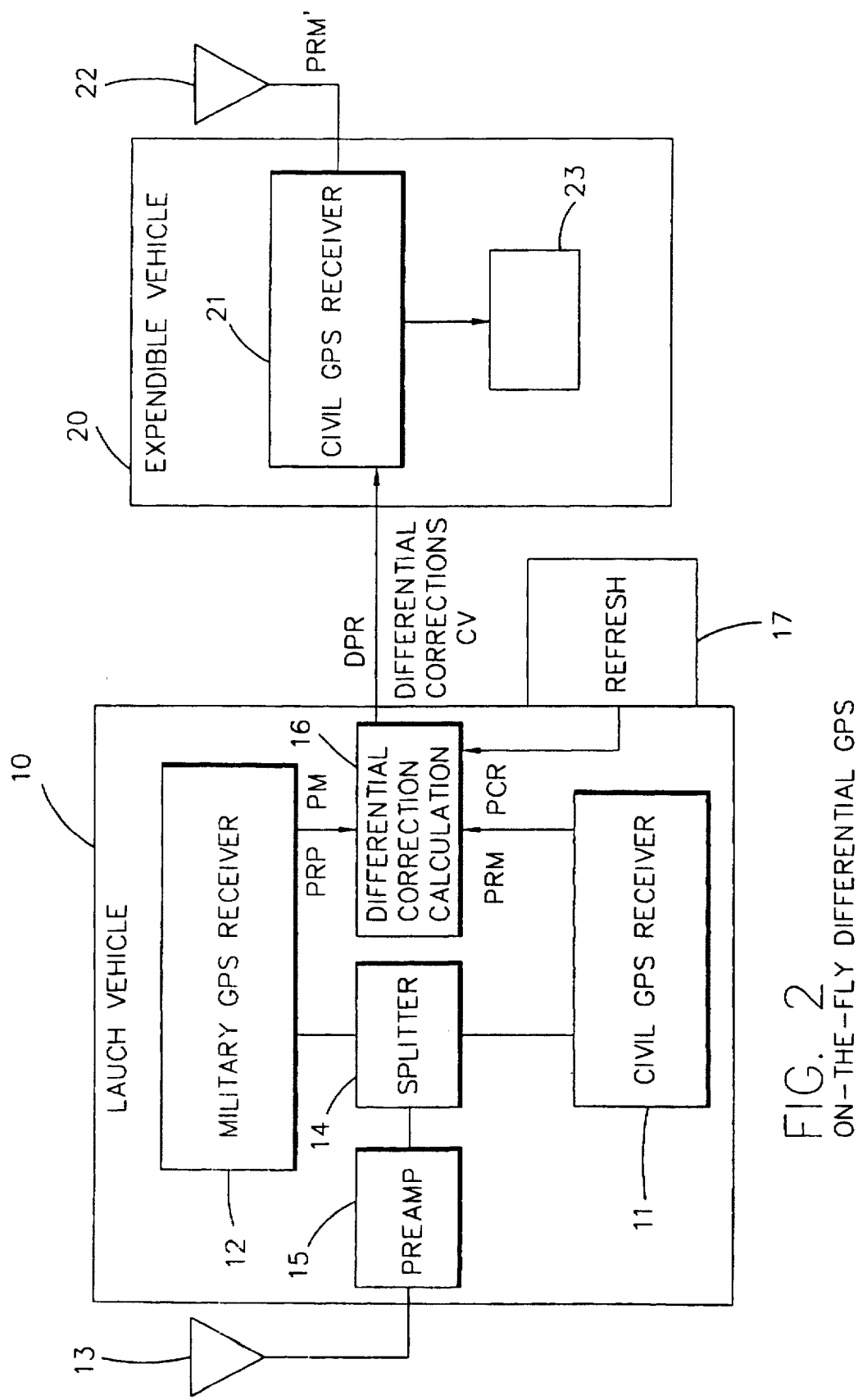
FIG. 2 is a block diagram illustrating an exemplary On-the-Fly Differential GPS system arrangement in accordance with the present invention.

More particularly, FIG. 2 illustrates an exemplary On-the-Fly Differential GPS system arrangement in accordance with the present invention. The civil GPS receiver 11 and the military GPS receiver 12 in the launch vehicle 10 share the same antenna 13 since the calculation of the position correction must be relative to the same point. This is easily accomplished by connecting both sets to a power splitter 14. If necessary, a preamplifier 15 can be used on the antenna output to overcome the signal strength loss due to the power split.

The differential correction, DPR, for each satellite tracked by the launch vehicle's civil GPS set 11 is calculated in a suitable computing device 16, receiving inputs from civil set 11 and military set 12, by differencing, i.e., determining the difference between, a predicted or estimated pseudorange, PRP, and a measured pseudorange, PRM. The predicted pseudorange PRP is calculated by computing the geometric range between the military set's position solution and the satellite position computed from the ephemeris evaluated at the transmission time, and adjusting that range by the satellite clock correction according to the relationship:

$$PRP = mag[M(tm) - E(tt)] - C(tt) \quad (1)$$

where $mag[x]$ = the magnitude of a three-dimensional vector, $M(.)$ = the position solution of the precise accuracy GPS receiver means, tm = measurement time, $E(.)$ = the ephemeris position model defined in the ICD-GPS-200 regulation, tt = transmission time, and $C(tt)$ = the satellite clock correction defined in the ICD-GPS-200 regulation.

The measured pseudorange, PRM, is calculated from the transmission time, tt, and the measurement or reception time, tm, as follows:

$$PRM = c*(tm - tt) \quad (2)$$

where c = the speed of light.

The differential correction, DPR, is computed for each satellite tracked by the civil GPS receiver 11 from the difference of (1) and (2):

$$DPR = PRM - PRP \quad (3)$$

This correction DPR for each satellite is sent to the civil receiver 21 in the expendable vehicle 20 to enhance the accuracy of its position solution. The expendable civil receiver 21 receives and applies each differential correction or position bias to its raw measurements PRM', obtained using information received directly from the satellites through antenna 22, to calculate the corrected measurement, PRC, by:

$$PRC = PRM' - DPR \quad (4)$$

The corrected measurement PRC is then processed by the navigation algorithm in the expendable civil receiver 21 to obtain the improved accuracy of its position solution for output and use in a utilization device 23.

The apparatus embodied in the system arrangement of FIG. 2 may also be used in implementing the On-the-Fly Relative Navigation technique as will be readily appreciated from a consideration of this technique as described above. For example, computing device 16 can be adapted for computing the difference between the civil and military GPS set position solutions to determine the position bias as follows. With all of the receivers using the same four satellites, the position correction vector CV can be calculated in computing device 16 by:

$$CV = PM - PCR$$

where

PM = position vector of the military GPS receiver; and

PCR = position vector of the civil GPS receiver in the launch vehicle.

Using CV, the corrected position PCMC of the civil GPS receiver in the expendable vehicle is obtained by:

$$PCMC = PCM - CV$$

where
PCM=uncorrected position of the civil GPS receiver in the expendable vehicle.

Also, a refresh device 17 for updating the differential corrections or the position bias on a regular basis may be provided to insure that the accuracy of the expendable civil GPS set will be refreshed and remain close to that of the military set. The refresh can be a simple continuation of the original process and essentially requires means for communicating the corrections to the expendable vehicle after launch.

It will therefore be seen from the foregoing descriptions that a system apparatus and techniques in accordance with the invention have been set forth for enhancing the accuracy of the position determination of a civil GPS receiver by correcting its measurements with data derived from a precise accuracy or military GPS receiver, and which particularly enable the enhancement of the accuracy of civil GPS receivers operating with SPS to offset the effect of SA. The invention dispenses with the need for a DGPS fixed reference station allowing mobility on the part of the enhanced GPS receiver and the two reference GPS receivers. Further, there is no direct use of classified data from the military receiver while accomplishing an enhancement of the civil receiver's position solution or determination that is comparable to that of the military receiver. The techniques are robust on mutual visibility requirements as long as there are four or more mutually visible satellites between the mobile user and the reference vehicle.

It is contemplated that the civil GPS receiver in the launch vehicle may be dispensed with and the equivalent corrections may still be performed by using the civil receiver in the expendable vehicle in its place, but the implementation will be more complex. For example, the calculations must take into account that the measurements used to make the corrections are from two different locations and the data from each receiver would likely be sent for processing to one location. Also, the expendable civil receiver must be able to track the GPS signals prior to launch. Consequently, the disclosed embodiment using the civil and military receiver combination in the launch vehicle is preferred.

What is claimed is:

1. Apparatus for on-the-fly accuracy enhancement of the position solution of a civil or degraded accuracy GPS receiver, comprising:

precise accuracy GPS receiver means and civil GPS receiver means, coupled to the same antenna, for producing respective position solutions in response to the receipt of GPS signals from a set of GPS satellites through said antenna;

means for comparing said respective position solutions and producing signals indicative of said comparisons; and means for providing said comparison indicative signals to said degraded accuracy GPS receiver to correct its position solutions for accuracy enhancement.

2. Apparatus as in claim 1 wherein:

said comparing means comprises means for determining position biases from said respective position solutions and producing position bias signals as said signals indicative of said comparisons; and said means for providing said comparison indicative signals comprises means for providing said position bias signals to said degraded accuracy GPS receiver to correct its position solutions.

3. Apparatus as in claim 2 wherein said degraded accuracy GPS receiver comprises:

means for directly obtaining satellite position information and producing measured position solution signals indicative of a position solution based thereon;

means for applying each position bias signal to said measured position solution signals, to obtain a corrected measurement; and means for applying a navigation algorithm to said corrected measurement to enhance the accuracy of the position solution of said degraded accuracy GPS receiver.

4. Apparatus as in claim 1 wherein:

said precise accuracy GPS receiver means and said civil GPS receiver means each comprise measuring means for calculating respective pseudorange measurements, as said respective position solutions, from said GPS signals, and said measuring means comprises:

means for calculating a predicted pseudorange PRP by computing the geometric range between the position solution of said precise accuracy GPS receiver means and a satellite's position computed from the ephemeris evaluated at the transmission time and adjusting said geometric range by the satellite clock correction according to the relationship:

$$PRP = mag[M(tm) - E(tt)] - C(tt)$$

where
PRP=the predicted pseudorange,
mag[x]=the magnitude of a three-dimensional vector,
M(.)=the position solution of the precise accuracy GPS receiver means,
tm=measurement time,
E(.)=the ephemeris position model defined in the ICD-GPS-200 regulation,
tt=transmission time,
C(tt)=the satellite clock correction defined in the ICD-GPS-200 regulation; and means for calculating a measured pseudorange PRM using the transmission time and reception time as follows:

$$PRM = c^*(tm - tt)$$

where
c=the speed of light; and
wherein said comparing means comprises:

means for determining the difference DPR between said predicted pseudorange PRP and said measured pseudorange PRM for each satellite tracked by said civil GPS receiver means, which difference is used to produce said position bias signal, by computing:

$$DPR = PRM - PRP.$$

5. Apparatus as in claim 4 wherein said degraded accuracy GPS receiver comprises:

means for directly obtaining satellite position information and producing measured position solution signals indicative of a position solution based thereon;

means for applying each position bias signal to said measured position solution signals, to obtain a corrected measurement PRC by:

$$PRC = PRM - DPR;$$

and means for applying a navigation algorithm to said corrected measurement PRC to enhance the accuracy of the position solution of said degraded accuracy GPS receiver.

6. Apparatus as in claim 1 further comprising means for regularly updating said comparison indicative signals.

7. Apparatus as in claim 1 further comprising:

a first mobile vehicle for mounting said degraded accuracy GPS receiver thereon; and a second mobile vehicle for mounting said precise accuracy GPS receiver means and said civil GPS receiver means thereon.

8. Apparatus as in claim 1 wherein said civil GPS receiver means comprises a civil GPS receiver and said precise accuracy GPS receiver means comprises a military GPS receiver.

9. Apparatus as in claim 1 further comprising means for controlling said degraded accuracy GPS receiver to track the same set of satellites as said precise accuracy GPS receiver means and said civil GPS receiver means.

10. A method for on-the-fly accuracy enhancement of the position solution of a first civil GPS receiver comprising the steps of:

coupling a precise accuracy GPS receiver and a second civil GPS receiver to the same antenna, and producing respective position solutions in response to the receipt of GPS signals from a set of GPS satellites through said antenna;

comparing said respective position solutions and producing signals indicative of said comparisons; and providing said comparison indicative signals to said first civil GPS receiver to correct its position solutions for accuracy enhancement.

11. The method of claim 10 wherein the step of comparing said respective position solutions comprises:

determining position biases from said respective position solutions and producing position bias signals as said signals indicative of said comparisons; and the step of providing said comparison indicative signals comprises:

providing said position bias signals to said first civil GPS receiver to correct its position solutions.

12. The method of claim 11 further comprising the steps of:

directly obtaining satellite position information in said first civil GPS receiver and producing measured position solution signals indicative of a position solution based thereon;

applying said position bias signals to said measured position solution signals, to obtain a corrected measurement; and applying a navigation algorithm to said corrected measurement to enhance the accuracy of the position solution of said first civil GPS receiver.

13. The method of claim 10 wherein the step of comparing said respective position solutions comprises:

first calculating, in said precise accuracy GPS receiver and said second civil GPS receiver, respective pseudorange measurements from said GPS signals, said first calculating step comprising:

calculating a predicted pseudorange by computing the geometric range between said precise accuracy GPS receiver's position solution and a satellite's position computed from the ephemeris evaluated at the transmission time and adjusting said geometric range by the satellite clock correction according to the relationship:

$$PRP = mag[M(tm) - E(tt)] - C(tt)$$

where

PRP = the predicted pseudorange, mag[x] = the magnitude of a three-dimensional vector, M(.) = the position solution of the precise accuracy GPS receiver means, tm = measurement time, E(.) = the ephemeris position model defined in the ICD-GPS-200 regulation, tt = transmission time, C(tt) = the satellite clock correction defined in the ICD-GPS-200 regulation; and then calculating a measured pseudorange using the transmission time and reception time as follows:

$$PRM = c*(tm - tt)$$

where c = the speed of light; and determining the difference DPR between said predicted pseudorange PRP and said measured pseudorange PRM for each satellite tracked by said second civil GPS receiver, which difference DPR is used to produce said position bias signal, by computing:

$$DPR = PRM - PRP.$$

14. The method of claim 13 wherein said first civil GPS receiver performs the steps comprising:

directly obtaining satellite position information and producing measured position solution signals indicative of a position solution based thereon;

applying each position bias signal to said measured position solution signals, to obtain a corrected measurement PRC by:

$$PRC = PRM - DPR;$$

and applying a navigation algorithm to said corrected measurement to enhance the accuracy of the position solution.

15. The method of claim 10 further comprising the step of regularly updating said comparison indicative signals.

16. The method of claim 10 further comprising the steps of disposing said first civil GPS receiver in an expendable vehicle and disposing said precise accuracy GPS receiver and said second civil GPS receiver in a mobile launch vehicle for said expendable vehicle.

17. The method of claim 10 wherein said precise accuracy GPS receiver is a military GPS receiver.

18. The method of claim 10 comprising the further step of controlling said first civil GPS receiver to track the same set of satellites as said precise accuracy GPS receiver means and said second civil GPS receiver means.

19. The method of claim 10 wherein the step of comparing said respective position solutions comprises:

with said precise accuracy GPS receiver and said first and second civil GPS receivers receiving signals from the same four satellites, determining position biases by calculating the position correction vector CV by:

$$CV = PM - PCR$$

where
PM=position vector of said preise accuracy GPS receiver; and
PCR=position vector of said first civil GPS receiver; and the step of providing said comparison indicative signals comprises using CV to obtain the corrected position PCMC of said first civil GPS receiver by calculating:

$$PCMC = PCM - CV$$

where
PCM=uncorrected position of said first civil GPS receiver.

* * * * *